United States Patent [19]

Blonk

[11] Patent Number: 5,517,004
[45] Date of Patent: May 14, 1996

[54] PROCESS AND APPARATUS FOR REMOVING CONTAMINATIONS FROM BULK MATERIAL

[75] Inventor: Dirk J. Blonk, Zegveld, Netherlands

[73] Assignee: Recycling Nederland Holding B.V., Zegveld, Netherlands

[21] Appl. No.: 211,883

[22] PCT Filed: Oct. 27, 1992

[86] PCT No.: PCT/NL92/00191

§ 371 Date: Apr. 22, 1994

§ 102(e) Date: Apr. 22, 1994

[87] PCT Pub. No.: WO93/08936

PCT Pub. Date: May 13, 1993

[30] Foreign Application Priority Data

Oct. 28, 1991 [NL] Netherlands .................. 9101802

[51] Int. Cl.$^6$ .................................................. H05B 6/10
[52] U.S. Cl. ..................... 219/652; 219/619; 219/651; 219/654; 588/234; 588/237
[58] Field of Search .................................. 219/652, 653, 219/651, 619, 654; 588/212, 220, 219, 222, 225, 247, 234, 237

[56] References Cited

U.S. PATENT DOCUMENTS

| | | | |
|---|---|---|---|
| 2,747,066 | 5/1956 | Brace | 219/615 |
| 2,972,818 | 2/1961 | Nebgen | 34/137 |
| 4,087,276 | 5/1978 | Generini | 75/81 |
| 4,181,846 | 1/1980 | Cunningham | 219/619 |
| 4,268,306 | 5/1981 | Bjorkman | 75/81 |
| 4,352,969 | 10/1982 | Wulf | 219/652 |
| 4,797,524 | 1/1989 | Moret et al. | 219/651 |
| 4,931,610 | 6/1990 | Hughes et al. | 219/618 |
| 5,134,260 | 7/1992 | Piehler et al. | 219/651 |

FOREIGN PATENT DOCUMENTS

| | | |
|---|---|---|
| 245655 | 11/1987 | European Pat. Off. . |
| 423039 | 4/1991 | European Pat. Off. . |
| 1360812 | 4/1964 | France . |
| 3738704 | 5/1989 | Germany . |
| 3816282 | 10/1989 | Germany . |
| 864242 | 3/1961 | United Kingdom . |
| 921654 | 3/1963 | United Kingdom . |

Primary Examiner—Philip Leung
Attorney, Agent, or Firm—DeLio & Peterson

[57] ABSTRACT

A method for removing one or more contaminations from a bulk material, the bulk material being fed into a treating chamber (1), exposed therein to a temperature treatment and then discharged. According to the invention, the bulk material is exposed to a vacuum treatment during temperature treatment. An apparatus according to the invention for the implementation of the method comprises a treating chamber (1) for treating contaminated bulk material therein, feeding means (2) for feeding the bulk material to the treating chamber (1), discharging means (9) for discharging the bulk material from the treating chamber and heating means (19) for heating the bulk material in the treating chamber. The apparatus also includes a vacuum forming means (16) for forming a vacuum in the treating chamber.

10 Claims, 2 Drawing Sheets

PROCESS AND APPARATUS FOR REMOVING CONTAMINATIONS FROM BULK MATERIAL

BACKGROUND OF THE INVENTION

1. Field of the Invention

The invention relates to a method for removing one or more contaminations from dry solid bulk material, in which method the dry solid bulk material is fed into a treating chamber, said treating chamber being formed by a drum rotatable around a rotation axis, which drum comprises a casing containing an electrically conductive material, said dry solid bulk material is subjected to a temperature treatment under subatmospheric pressure during rotation of the drum by heating the container by means of electrical induction heating and said treated dry solid bulk material is discharged from said treating chamber.

2. Description of Related Art

The invention relates furthermore to an apparatus for carrying out the method according to the invention, said apparatus comprising a treating chamber for the treatment therein of contaminated dry solid bulk material, the treating chamber being a drum of which the casing contains an electrically conductive material, the apparatus comprising rotating means for rotating the drum around a rotational axis, feeding means for feeding the dry solid bulk material in the treating chamber, discharging means for discharging the treated dry solid bulk material from the treating chamber, heating means comprising an electrical induction means arranged around the drum for heating the dry solid bulk material in the treating chamber, and vacuum means for forming a subatmospheric pressure in the treating chamber.

A method as described in the opening paragraph is known from EP 0 423 039 A1. In this method the dry solid bulk material is fed in the drum through an opening after which the drum is activated to rotate. During rotation the dry solid bulk material is subjected to a temperature which is strictly lower than 500° C. at a pressure which is in the order of 0.01 bar or more, for a period of three hours or more in order to remove contaminations. After this treatment the dry solid bulk material is discharged through the same opening.

It is one of the objects of the invention to provide a method for removing one or more contaminations from a dry solid bulk material with which a high removal yield can be achieved in an efficient way with no or at least a low risk to the environment.

It is another object of the invention to provide an apparatus for carrying out the inventive method.

SUMMARY OF THE INVENTION

For this purpose a method as described in the opening paragraph is, in accordance with the invention, characterized in that said drum is provided with at least one entrance and at least one separate exit, in that the dry solid bulk material is fed into the drum through said at least one entrance, in that the drum is rotated for continuously transporting said solid dry bulk material from said at least one entrance to said at least one exit, in that said dry solid bulk material is subjected to a subatmospheric pressure lower than 3 mbar, and in that said treated dry solid bulk material is discharged from the drum through said at least on exit.

The vacuum treatment of the bulk material has an important advantage, particularly by the formation of a high vacuum, i.e. a pressure lower than 3 mbar in the treating chamber, in that the vapour pressure and therefore also the boiling point of the contaminations is lowered, so that the contaminations can easily escape from the bulk material. By doing so contaminations containing heavy metals, such as cadmium or less volatile hydrocarbon compounds, such as insecticides, pesticides and PCB's can also be removed. Besides, the closed vacuum system reduces leakage of vapours to an absolute minimum. Apart from that, the absence of air in the treating chamber prevents the formation of dioxines and other environmentally hazardous substances formed by oxidization. As the quantity of combustion gases is very small, the follow-up treatment of the extracted vapours can take place more efficiently.

Furthermore, by continuously transporting the dry solid bulk material through the drum the length of stay of the bulk material in the drum can be decreased or the processing capacity of the latter can be enlarged at the same machine speed, since the bulk material is mixed together in such a way that each time other bulk material comes to the surface, which furthers the removal of contaminations.

Test have shown that a high removal yield is achieved, even when the length of treatment is short, to such an extent that the residue concentration of one or more contaminations in the bulk material Is far below the maximum level permitted by the authorities.

The contaminated bulk material can contain any contaminated substance, for example waste, which is polluted by one or more vaporizable substances such as mercury, lead, antimony or hydrocarbon. Favourable results have been shown, especially with mercury polluted fluorescent powder originating from gas-discharge lamps.

In U.S. Pat. No. 4,087,276 a method for the removal of mercury from sludge containing mercury is described, which method comprises the steps of continuously transporting the sludge and heating the sludge at a temperature of 200° C. to 340° C. at a pressure from 0.06 to 0.1 atmospheres. The use of a high vacuum, a rotating treating chamber and induction heating, however, is not described herein.

In DE 38 16 282 C1 a method for removing mercury from bulk material by means of destillation is described. In this method a suspension instead of a dry solid is fed into the treating chamber, and heating of the suspension is not effected by means of induction heating.

In EP 0245 655 A2 a method for removing volatile contaminations from contaminated bulk material is described, in which method the bulk material is subjected to under pressure provided by means of a ventilator. In contrast to the invention, the bulk material is not subjected to a high vacuum, i.e. a pressure lower than 3 mbar.

Preference is given to the formation of a vacuum in the drum with a pressure between 0.5 and 1 mbar. The drum is preferably rotated at a rotational speed between 0.5 and 500 rotations per minute.

According to an embodiment of a method according to the invention feeding and/or discharging of the bulk material occurs in each case through at least two passages, which are alternately released. In this way, it can easily be arranged that the high vacuum in the drum is also retained during feeding and/or discharging of the bulk material, so that treatment in the drum need not be interrupted.

In accordance with another aspect of the invention an apparatus for carrying out the method according to the invention is provided, which apparatus comprises a treating chamber for the treatment therein of contaminated dry solid bulk material, the treating chamber being a drum of which the casing contains an electrically conductive material, the apparatus comprising rotating means for rotating the drum around a rotational axis, feeding means for feeding the dry solid bulk material in the treating chamber, discharging means for discharging the treated dry solid bulk material from the treating chamber, heating means comprising an electrical induction means arranged around the drum for heating the dry solid bulk material in the treating chamber, and vacuum means for forming a subatmospheric pressure in the treating chamber, characterized in that said drum comprises at least one entrance for feeding the dry solid bulk material in the drum and at least one separate exit for discharging the treated dry solid bulk material from the drum, and in that said vacuum are vacuum means for forming a subatmospheric pressure in the drum which is lower than 3 mbar.

In a preferred embodiment of an apparatus according to the invention the drum is essentially cylindrical, the ends of which are provided with coupling means for coupling the feeding means to the at least on entrance and the discharging means to the at least one exit, said coupling means comprising flange connections in which at least one heat insulating packing is fitted. A good heating insulation is attained hereby if the coupling means comprise flange connections in which at least one heat insulating packing is fitted.

In a further embodiment of an apparatus according to the invention the feeding and discharging means each comprise a rotatable, helical body comprising a hollow axle arranged coaxially with regard to the drum, the axle cavity of one of the helical bodies being connected on the one hand to the vacuum means and forming on the other hand an open connection to the drum, each helical body being securely connected to the cylindrical drum, and each axle being placed in sliding ring seals.

For additional mixing of the bulk material in the drum, the latter can be provided on the inside with one or more baffles.

BRIEF DESCRIPTION OF THE DRAWINGS

The invention will be explained in the following among other things on the basis of a preferred embodiment of the apparatus of the invention, referring to the figures, in which.

DESCRIPTION OF THE PREFERRED EMBODIMENTS

Figure 1:
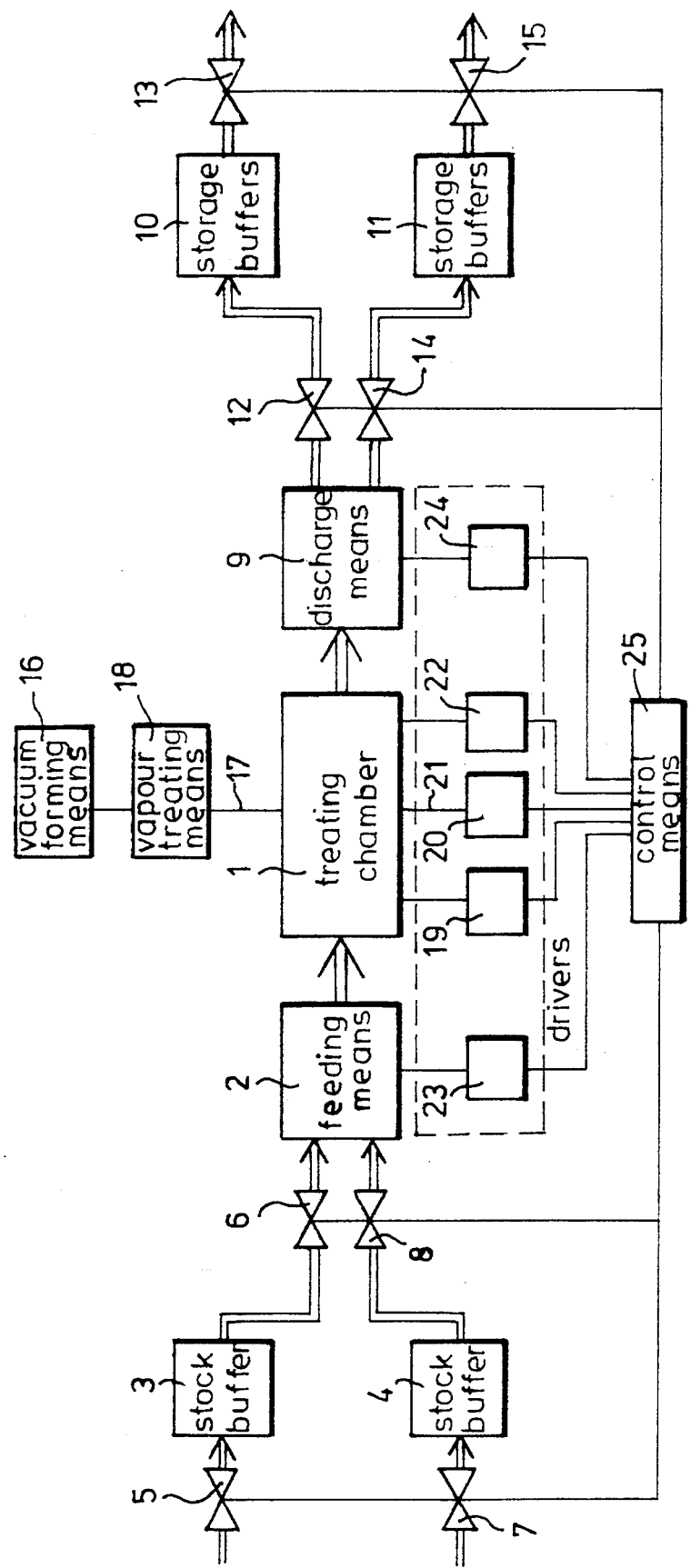
FIG. 1 shows a block diagram in explanation of the method and apparatus according to the invention.

In FIG. 1 the continuous double lines indicate the path of the bulk material, the arrows showing the direction of conveyance. The continuous single lines represent connecting or control pipes which, depending on the function, can for instance be electric, pneumatic or hydraulic pipes.

Contaminated bulk material is fed from a feeding means 2 to a treating chamber 1, which then in turn is fed to feeding means 2 from stock buffers 3 and 4, the inlets and outlets of which are regulated in this case by valves 5 to 8. In treating chamber 1 treated bulk material is discharged through a discharging means 9 to two storage buffers 10 and 11, the inlets and outlets of which are regulated by valves 12 to 15.

In chamber 1 a vaccuum is formed by a vacuum forming means 16, which is coupled by means of a vacuum pipe 17 to chamber 1, a vapour treating means 18 being provided in the pipe for treating the expelled vapours. The means 18 can contain condensers, active carbon filters, catalysts, agents for a wet gas washing and so on.

Moreover, a heating means 19 is shown in diagram form in FIG. 1 for heating the bulk material in the chamber 1, a feeding means for a rinsing agent 20 for feeding a rinsing agent by means of a feeding pipe 21 to the chamber, and driving means 22, 23, 24 for driving chamber 1 and the feeding and discharging means 2 and 9 respectively, in order to ensure a regular, continual conveyance of the bulk material.

In the diagram shown the valves 5 to 8, 12 to 15, the heating means 19, the feeding means for the rinsing agent 20 and the driving means 22 to 24 are represented as being controlled from a centre point by a control means 25 which can, for example, be a computer.

Figure 2:
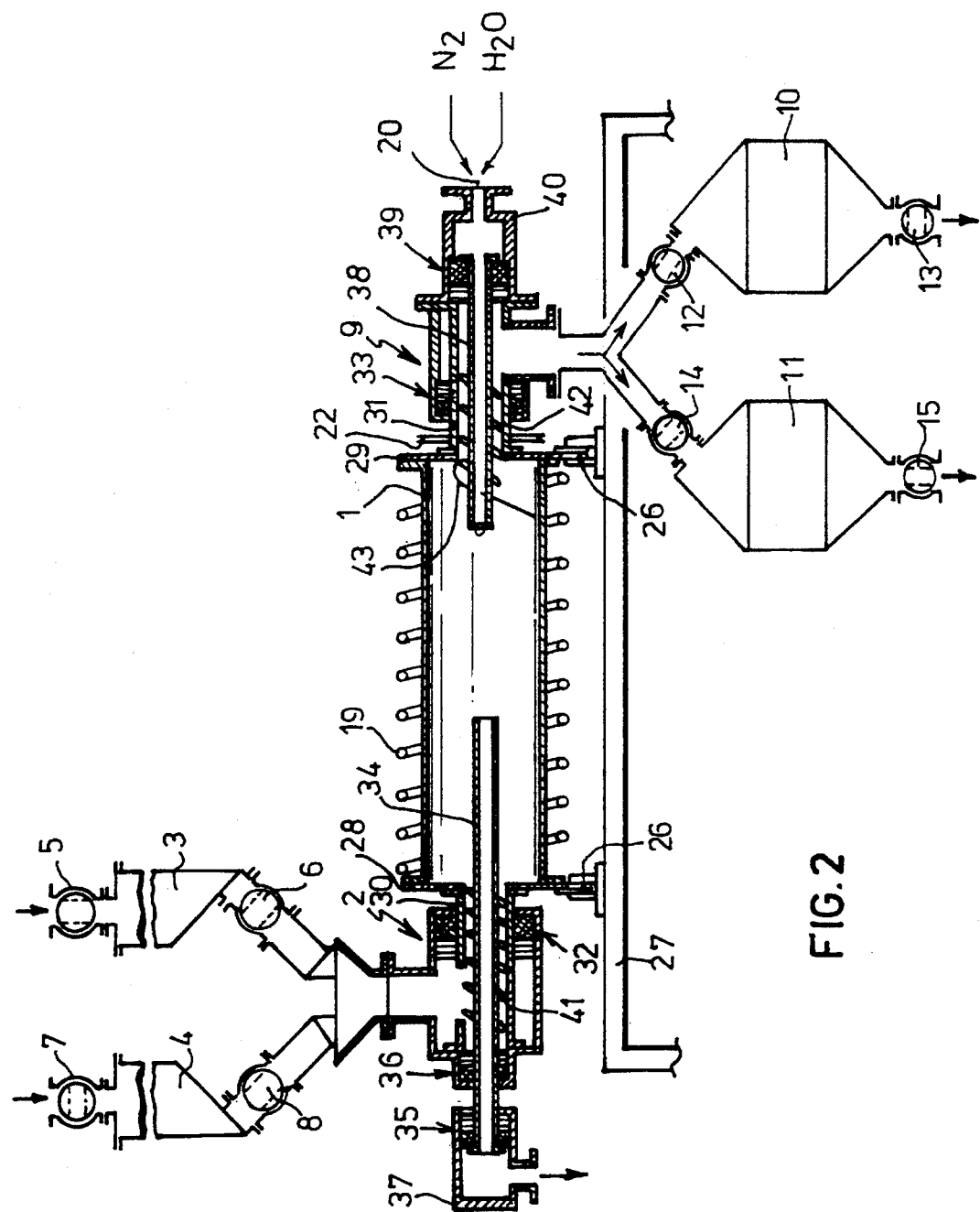
FIG. 2 shows a diagram of a preferred embodiment of the apparatus according to the invention.

FIG. 2 shows a preferred embodiment of the apparatus according to the invention in diagram form. Here the parts which correspond to those according to FIG. 1 are provided with the same reference numbers.

In this embodiment the treating chamber 1 is formed by a cylindrical container, in particular a drum, which is rotatably supported by rollers 26 mounted on a frame 27 adjustable in height and in the angle of inclination. The ends of the drum, which determine an entrance and an exit of the drum respectively, are closed by head flanges 28, 29 provided with collars 30, 31, in which in each case between drum 1 and the flanges 28, 29 one packing - not shown - is disposed, preferably in the form of a metal seal made of annealed copper or titanium, these materials being highly resistant to high operating temperatures. At lower operating temperatures, for example up to 500° C., packings made of an elastomer or asbestos are used. The flange connections allow for an easy dismantling of the drum 1, for example for maintenance purposes, and also facilitate the requested lengthening of the drum by linking various sections to one another, each section being, for example, one meter long with a diameter of 30 centimeters.

The collars 30, 31 are inserted into the feeding means 2 and the discharge means 9 respectively and are supported by sliding ring seals 32, 33 respectively. Besides that, the sliding ring seals can be subjected externally to underpressure to prevent lubricants escaping from the seals.

A hollow axle 34 extends through the feeding means 2 up to a central part of the drum 1. The axle 34 is supported by sliding rings seals 32, 35 and 36. The axle cavity is connected by means of a coupling section 37 to a vacuum pump - not shown - for forming a vacuum in the drum 1.

A hollow axle 38 which is inserted in the drum 1 extends through the discharging means 9 and is supported by sliding ring seals 33 and 39. By means of a coupling section 40 nitrogen, water and/or air is blown into the the drum 1 in order to disperse vapours which have escaped from the bulk material.

The sliding ring seals 32, 33, 35, 36 and 39 can, for instance, be made of silicon carbide, stainless steel, carbon or nylon, depending on the locally prevailing temperature.

On each of the axles 34, 38 a screw 41, 42 respectively is mounted, connected firmly on the circumference to the collar 30, 31 respectively. The screws 41, 42 thus each form a screw conveyor so that the bulk material is conveyed into and out of the drum 1 respectively. The drum 1 and the screws 41, 42 are jointly driven by means of the single driving means 22 which can be a mechanical transmission. In order to discharge the bulk material proportionately from the drum, a baffle or scoop 43 is provided in the vicinity of the headflange 29 to carry along a measured quantity of bulk material to the screw 42 after each revolution. The carrying velocity through the drum 1 is determined not only by the physical qualities of the material and the rotation velocity of the drum, but also by the angle of inclination of the drum and can also be influenced by other baffles disposed on the inside of the drum, for example, a helical baffle which extends along the length of the drum. The speed of revolution of the drum is essentially determined by the nature of the bulk material and can vary from, for instance, 0,5 revolutions per minute for powdered bulk material to 500 revolutions per minute for silt-free sand. The drive through the driving means 22 preferably occurs stepless by means of a hydraulic motor.

Drum 1 is heated inductively by an induction coil 19, for which purpose the casing of the drum is made of an electrically conductive material such as steel. The head flanges 28, 29 are, on the other hand, not electrically conductive, in order to restrict a transfer of warmth from the drum to the feeding means 2 and the discharge means 9 as much as possible.

The operating temperature in the drum at the prevailing pressure is in the main determined by the boiling point of the contaminations to be removed and can for instance be 500° to 600° C. Heavy metals such as cadmium require a higher temperature, for example in the region of 1200° C. to 1300° C. at one millibar.

During operation the buffers 3, 4, and 10, 11 respectively are released in turn. In FIG. 2 the situation is shown whereby the buffers 4 and 10 are released. In this position the other buffers, in FIGS. 3 and 11, are being filled or emptied respectively by opening the valve 5, 15 respectively, in the course of which, after the closure of these valves, the buffers 3 and 11 are pre-evacuated, prior to opening valves 6 and 4, after closure of the valves 8 and 12, so that a current of air from the buffers is prevented from entering the treating chamber through the screws 41, 42. It is plain that if a suitable control of the valves 6, 8, 12 and 14 rather than a continuous feeding and discharging is selected, then loading and unloading the drum in a "batch" fashion can be achieved.

In the case of silt-type bulk material the buffers 3 and 4 can be preceded by a pre-drying installation for a phased pre-drying of the bulk material.

For an expert it will be evident that many modifications in the above described preferred embodiment of the apparatus according to the invention can be introduced without, however, having to abandon the framework of the invention. For instance, instead of inductive heating, the bulk material can be heated by high frequency irradiation or by gas burners. Instead of using a screw conveyor, feeding can also be done by extrusion, particularly in the case of silt-type bulk material.

I claim:

1. A method for removing contaminations from dry solid bulk material comprising the steps of:

feeding the dry solid bulk material into a treating chamber, said treating chamber comprising a drum rotatable around a rotation axis, said drum comprising a casing containing an electrically conductive material and having at least one entrance and at least one separate exit, the dry bulk material being fed into said drum through said at least one entrance;

rotating the drum for continuously transporting dry solid bulk material from said at least one entrance to said at least one exit;

subjecting said dry solid bulk material to a temperature treatment under subatmospheric pressure lower than 3 mbar during rotation of the drum by heating the container by means of electrical induction heating; and discharging said treated dry solid bulk material from said drum through said at least one exit.

2. The method according to claim 1 wherein said subjecting step comprises subjecting the dry solid bulk material to a subatmospheric pressure between about 0.5 and 1 mbar.

3. The method according to claim 1 wherein said rotating step comprises rotating said drum at a rotational speed between about 0.5 and 500 rotations per minute.

4. The method according to claim 1 wherein said feeding and discharging steps comprise feeding and discharging the bulk material by means of at least two passages, which are alternately released.

5. A method of removing contaminations from dry solid bulk material comprising the steps of:

providing an apparatus comprising a treating chamber for the treatment therein of contaminated dry solid bulk material, said treating chamber comprising a drum having a casing containing an electrically conductive material, said drum comprising at least one entrance and at least one separate exit, said apparatus further comprising rotating means for rotating said drum around a rotational axis, feeding means for feeding the dry solid bulk material into said drum through said at least one entrance, discharging means for discharging the treated dry solid bulk material from said drum through said at least one exit, heating means comprising an electrical induction means arranged around said drum for heating the dry solid bulk material in said treating chamber, and vacuum means for forming a subatmospheric pressure in said drum which is lower than 3 mbar;

feeding the dry solid bulk material into said drum through said at least one entrance;

rotating the drum for continuously transporting the dry solid bulk material from said at least one entrance to said at least one separate exit;

subjecting said dry solid bulk material to a temperature treatment under subatmospheric pressure below 3 mbar during rotation of the drum by heating the container by means of electrical induction heating; and discharging said treated dry solid bulk material from said drum through said at least one separate exit.

6. The method according to claim 5 wherein said drum is substantially cylindrical, the ends of which are provided with coupling means for coupling the feeding means to said at least one entrance and the discharging means to said at least one exit, said coupling means comprising flange connections in which at least one heat insulating packing is fitted.

7. The method according to claim 5 or 6, wherein said feeding and discharging means each comprise a rotatable, helical body comprising a hollow axle arranged coaxially with regard to said drum, the axle cavity of one of said helical bodies being connected on the one hand to said vacuum means and forming on the other hand an open connection to said drum, each helical body being securely connected to said cylindrical drum, and each axle being placed in sliding ring seals.

8. The method according to claim 5 wherein said drum is internally provided with at least one baffle.

9. An apparatus for removing contaminations from bulk material comprising:

a treating chamber for the treatment therein of contaminated dry solid bulk material, said treating chamber comprising a drum having a casing containing an electrically conductive material, said drum being rotatable about an axis and having at least one entrance for feeding the dry solid bulk material into said drum and at least one separate exit for discharging the treated dry solid bulk material from said drum;

a drive mechanism for rotating said drum about the rotational axis;

a feeding means for feeding the dry solid bulk material into said drum through said at least one entrance;

a discharging means for discharging the treated dry solid bulk material from said drum through said at least one separate exit;

a pair of coupling means, each of which operatively connected to a corresponding end of said drum for coupling said feeding means to said at least one entrance and the discharging means to said at least one exit, each of said coupling means comprising a flange connection that includes at least one heat insulating packing;

a heater comprising an electrical inductor positioned around said drum for heating the dry solid bulk material therein; and a vacuum producing device for forming a subatmospheric pressure in said drum that is lower than 3 mbar.

10. The apparatus of claim 9 further comprising at least one baffle located within said drum and wherein said feeding means and discharging means each comprise a rotatable, helical body secured to said drum, said helical body comprising a hollow axle arranged coaxially with regard to said drum, the axle cavity of one of said helical bodies being connected on the one hand to said vacuum means and forming on the other hand an open connection to said drum, each of said axles being placed in sliding ring seals.

* * * * *